United States Patent
Wilcox et al.

(10) Patent No.: US 12,483,282 B2
(45) Date of Patent: Nov. 25, 2025

(54) EXPEDITING FIELD CONVERGENCE OF FREQUENCY-TEMPERATURE MODEL OF RESONATOR OSCILLATORS USED IN TRANSCEIVERS

(71) Applicant: QUALCOMM Incorporated, San Diego, CA (US)

(72) Inventors: Rick Wilcox, San Diego, CA (US); Troy Curtiss, Boulder, CO (US); Joseph Maalouf, San Diego, CA (US); Mohammed Tawashi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 694 days.

(21) Appl. No.: 17/869,713

(22) Filed: Jul. 20, 2022

(65) Prior Publication Data
US 2024/0030946 A1    Jan. 25, 2024

(51) Int. Cl.
H04B 1/036    (2006.01)
H04B 1/04    (2006.01)
H04M 1/73    (2006.01)

(52) U.S. Cl.
CPC .............. *H04B 1/036* (2013.01); *H04B 1/04* (2013.01); *H04M 1/73* (2013.01)

(58) Field of Classification Search
CPC . H04B 1/036; H04B 1/04; H04M 1/73; H03L 1/026; H03L 1/022
USPC ........................................ 455/552.1; 370/338
See application file for complete search history.

(56) References Cited

U.S. PATENT DOCUMENTS

| | | | |
|---|---|---|---|
| 8,031,024 B1* | 10/2011 | Zaslavsky | H03L 1/026 455/76 |
| 2013/0257554 A1 | 10/2013 | Ishii et al. | |
| 2015/0108898 A1* | 4/2015 | Cheung | H05H 1/30 315/111.51 |
| 2020/0292395 A1 | 9/2020 | Babitch et al. | |
| 2023/0231592 A1 | 7/2023 | Littow et al. | |

FOREIGN PATENT DOCUMENTS

| | | |
|---|---|---|
| EP | 3901665 A1 | 10/2021 |
| WO | 2021239978 A1 | 12/2021 |

OTHER PUBLICATIONS

International Search Report and Written Opinion—PCT/US2023/068686—ISA/EPO—Oct. 11, 2023.

\* cited by examiner

*Primary Examiner* — Marcos Batista
(74) *Attorney, Agent, or Firm* — Loza & Loza LLP

(57) ABSTRACT

An aspect of the disclosure relates to a user equipment (UE) including: at least one antenna; a transceiver coupled to the at least one antenna, wherein the transceiver comprises: a resonator oscillator configured to generate a resonator signal; and a temperature sensor configured to generate a temperature signal related to a temperature of the resonator oscillator; an applications processor coupled to the transceiver; and a resonator field calibrator coupled to the applications processor and the transceiver.

30 Claims, 9 Drawing Sheets

EXPEDITING FIELD CONVERGENCE OF FREQUENCY-TEMPERATURE MODEL OF RESONATOR OSCILLATORS USED IN TRANSCEIVERS

FIELD

Aspects of the present disclosure relate generally to resonator oscillators (e.g., crystal oscillators), and in particular, to expediting field convergence of a frequency-temperature characteristic model of resonator oscillators used in radio frequency (RF) receivers or transceivers.

BACKGROUND

A user equipment (UE) employs a receiver or transceiver that receives radio frequency (RF) signals from various network entities, such as base stations in the case of a wireless wide area network (WWAN), satellites in the case of a global navigation satellite system (GNSS), and/or access points in the case of a wireless local area network (WLAN) (e.g., WiFi). The receiver or transceiver employs a local oscillator (LO) driven by a resonator oscillator to generate an LO signal to downconvert the received RF signals into defined frequency range baseband (BB) signals. If the frequency of the LO signal is out-of-specification due to frequency error or drifts in a resonator signal generated by the resonator oscillator, the receiver or transceiver may fail to lock onto or synchronize with the received RF signals.

SUMMARY

The following presents a simplified summary of one or more implementations in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

An aspect of the disclosure relates to a user equipment (UE). The UE includes at least one antenna; a transceiver coupled to the at least one antenna, wherein the transceiver comprises: a resonator oscillator configured to generate a resonator signal, and a temperature sensor configured to generate a temperature signal related to a temperature of the resonator oscillator; an applications processor coupled to the transceiver; and a resonator field calibrator coupled to the applications processor and the transceiver.

Another aspect of the disclosure relates to a method for temperature compensation. The method includes instructing an applications processor to operate in a first power mode of operation; receiving a first set of frequency-temperature vectors associated with a resonator oscillator of a transceiver while the applications processor is operating in the first power mode of operation; updating a frequency-temperature characteristic model of the resonator oscillator based on the first set of frequency-temperature vectors; and adjusting a frequency of a resonator signal generated by the resonator oscillator based on the updated frequency-temperature characteristic model.

Another aspect of the disclosure relates to an apparatus. The apparatus includes means for instructing an applications processor to operate in a first power mode of operation; means for receiving a first set of frequency-temperature vectors associated with a resonator oscillator of a receiver while the applications processor is operating in the first power mode of operation; means for updating a frequency-temperature characteristic model of the resonator oscillator based on the first set of frequency-temperature vectors; and means for adjusting a frequency of a resonator signal generated by the resonator oscillator based on the updated frequency-temperature characteristic model.

Another aspect of the disclosure relates to a non-transitory computer-readable medium storing computer-executable code, comprising code for causing a processor in a user equipment to: instruct an applications processor to operate in a first power mode of operation; receive a first set of frequency-temperature vectors associated with a resonator oscillator of a receiver while the applications processor is operating in the first power mode of operation; update a frequency-temperature characteristic model of the resonator oscillator based on the first set of frequency-temperature vectors; and adjust a frequency of a resonator signal generated by the resonator oscillator based on the updated frequency-temperature characteristic model.

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the description implementations are intended to include all such aspects and their equivalents.

BRIEF DESCRIPTION OF THE DRAWINGS

FIG. 7B-1/7B-2 illustrate a flow diagram of another example method of field updating a frequency-temperature characteristic model of a resonator oscillator and use thereof in accordance with another aspect of the disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
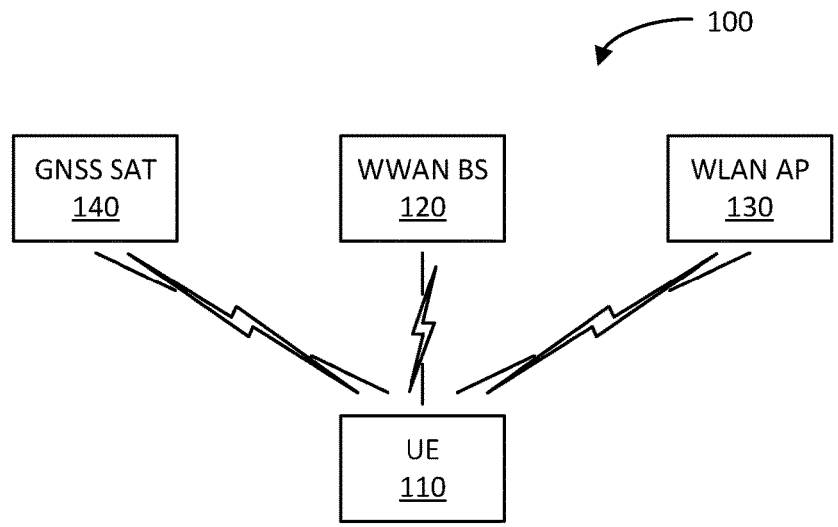
FIG. 1 illustrates a block diagram of an example wireless communication system in accordance with an aspect of the disclosure.

FIG. 1 illustrates a block diagram of an example wireless communication system 100 in accordance with an aspect of the disclosure. The wireless communication system 100 includes a user equipment (UE) 110, one or more global navigation satellite system (GNSS) satellites 140, one or more wireless wide area network (WWAN) base stations (BS) 120, and one or more wireless local area network (WLAN) (e.g., WiFi) access points (AP) 130. It shall be understood that the wireless communication system 100 is merely one example, and may be configured differently.

The UE 110, which may be implemented per any of a number of different types of wireless devices (e.g., smart phones, automobile wireless devices (e.g., telematics, infotainment, etc.), desktop computers, laptop computers, tablet devices, wearable devices, medical devices, Internet of Things (IoT), etc.), communicates wirelessly with the one or more GNSS satellites 140, the one or more WWAN BS 120, and the one or more WLAN AP 130. As an automobile, which may include a Cellular Vehicle-to-Everything (C2VX) system, may be subjected to wider temperature ranges (e.g., −30 Celsius (° C.) (e.g., a cold morning in Alaska) to 90° C. (e.g., in direct sunlight on a hot afternoon in Arizona) as compared to other devices (e.g., a smart phone), the frequency-temperature modeling described herein may be particularly useful in automobiles and other devices that may be subjected to wide temperature ranges.

For example, if the UE 110 is running a navigation-related application, the UE 110 may wirelessly receive radio frequency (RF) signals from the one or more GNSS satellites 140 to receive location-determining information. If the UE 110 is running a WWAN-related application (e.g., accessing the Internet and/or a voice/video call), the UE 110 may wirelessly receive RF signals from the one or more WWAN BS 120 to receive voice/video and/or data. If the UE 110 is running a WLAN-related application (e.g., accessing a multimedia streaming service), the UE 110 may wirelessly receive RF signals from the one or more WLAN AP 130 to receive the streaming multimedia data.

In extracting the information/data from the received RF signals, the UE 110 frequency down converts the received RF signal by mixing the RF signal with a local oscillator (LO) signal to generate a baseband (BB) signal. The BB signal is then further processed to extract the embedded information/data. The frequency of the BB signal is a difference in the frequency of the RF signal carrier and the frequency of the LO signal. If the receiver implemented in the UE 110 is a zero intermediate frequency (ZIF) receiver, the BB signal is centered at zero (0) Hz; or in other words, the frequency of the LO signal is the same as the frequency of the received RF signal carrier. If the receiver implemented in the UE 110 is a non-zero intermediate frequency (NZIF) receiver, the BB signal will be centered at plus and minus the difference between the frequencies of the RF carrier and the LO signal. For ease of explanation, a ZIF receiver is used herein as an example; however, it shall be understood that the UE 110 may be implemented with a NZIF receiver.

The frequency of the RF signal carriers transmitted by the one or more GNSS satellites 140, the one or more WWAN BS 120, and the one or more WLAN AP 130 are generally very precise and controlled. This is because the one or more GNSS satellites 140, the one or more WWAN BS 120, and the one or more WLAN AP 130 include expensive oscillators (e.g., cesium atomic clocks) to generate highly frequency accurate and frequency stable RF signal carriers. These signals are often referred to as a "gold standard" because of their accuracy and stability.

On the other hand, the UE 110 may generally use a relatively inexpensive resonator oscillator, such as a crystal oscillator or a microelectromechanical (MEMS) resonator oscillator, to generate the LO signal. Such inexpensive resonator oscillators may vary significantly with environment temperature. However, once a UE 110 is locked onto (synchronized with) the RF signal carrier, the UE 110 is able to wirelessly communicate with the network entity (e.g., GNSS satellite 140, WWAN BS 120, and/or WLAN AP 130) even though the frequency of the LO signal is changing due to the resonator oscillator's variance with temperature and/or aging. But, for the UE 110 to initially lock to the RF signal carrier, especially when first turned on (out-of-the-box) by a user or cold restart thereafter, the frequency of the LO signal should be within a range of its target frequency. If not, the UE 110 may not be able to lock onto the RF signal carrier; and thus, not able to wirelessly communicate with (camp on) the corresponding network entity.

Figure 2:
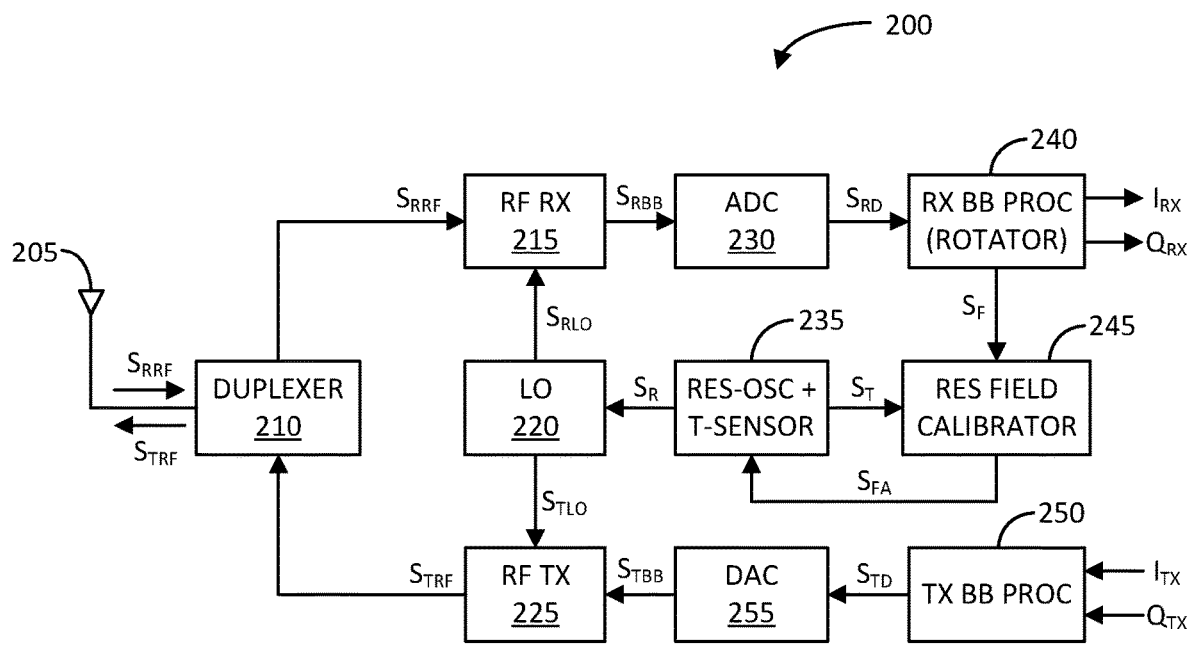
FIG. 2 illustrates a block diagram of an example transceiver in accordance with another aspect of the disclosure.

FIG. 2 illustrates a block diagram of an example transceiver 200 in accordance with another aspect of the disclosure. The transceiver 200 may be implemented in the UE 110.

Although a transceiver is used to exemplify the concepts herein, it shall be understood that the UE 110 may incorporate only a receiver (not the transmitter), as in the case of a global positioning system (GPS) receiver that receives the signals from the one or more GNSS satellites 140, but does not transmit signals to the one or more GNSS satellites 140.

The transceiver 200 includes at least one antenna 205 (e.g., an antenna array), a duplexer 210, a radio frequency (RF) receiver (RX) 215, an analog-to-digital converter (ADC) 230, and a receiver (RX) baseband (BB) processor (e.g., including I/Q phase rotator processing). The transceiver 200 may include a transmitter (TX) baseband (BB) processor 250, a digital-to-analog converter (DAC) 255, and a radio frequency (RF) transmitter (TX) 225. Additionally, the transceiver 200 includes a local oscillator (LO) 220, a resonator oscillator 235 (e.g., a crystal or MEMS resonator oscillator with an associated temperature sensor (e.g., thermistor)), and a resonator field calibrator 245.

In a receiving application, the at least one antenna 205 picks up an RF signal $S_{RRF}$ transmitted by a network entity (e.g., GNSS satellite 140, WWAN BS 120, or WLAN AP 130). The duplexer 210 routes the received RF signal $S_{RRF}$ to an input of the RF RX 215, while substantially isolating the input of the RF RX 215 from a transmit RF signal $S_{TRF}$ generated by the RF TX 225. The RF RX 215 processes the received RF signal $S_{RRF}$ to generate a received baseband signal $S_{RBB}$. In this regard, the RF RX 215 may low noise amplify the received RF signal $S_{RRF}$, frequency down convert the amplified received RF signal using a receiver LO signal $S_{RLO}$, and filter the down converted signal to generate the received baseband signal $S_{RBB}$. The ADC 230 digitizes the received baseband signal $S_{RBB}$ to generate a digitized received baseband signal $S_{RD}$. The RX BB processor 240 processes the received baseband signal $S_{RD}$ to generate the received $I_{RX}$ and $Q_{RX}$ data components of the received baseband signal $S_{RD}$.

In a transmitting application, the TX BB processor 250 receives and processes transmit $I_{TX}$ and $Q_{TX}$ data components to generate a transmit baseband digital signal $S_{TD}$. The DAC 255 converts the transmit baseband digital signal $S_{TD}$ into a transmit baseband analog signal $S_TBB$. The RF TX 225 processes the transmit baseband analog signal $S_TBB$ to generate the transmit RF signal $S_{TRF}$. In this regard, the RF TX 225 may frequency up convert the transmit baseband analog signal $S_{TBB}$ using a transmitter LO signal $S_{TLO}$, filter the up converted signal, and power amplify the filtered signal to generate the transmit RF signal $S_{TRF}$. The duplexer 210 routes the transmit RF signal $S_{TRF}$ to the at least one antenna 205 for radiation into free space for transmission to the network entity (e.g., GNSS satellite 140, WWAN BS 120, or WLAN AP 130).

The LO 220 generates the receiver LO signal $S_{RLO}$ and the transmitter LO signal $S_{TLO}$ based on a resonator signal $S_R$ generated by the resonator oscillator 235. For example, the LO 220 may include a receiver phase locked loop (PLL) to generate the receiver LO signal $S_{RLO}$ by frequency multiplying the resonator signal $S_R$. Similarly, the LO 220 may include a transmitter PLL to generate the transmitter LO signal $S_{TLO}$ by frequency multiplying the resonator signal $S_R$.

As previously discussed with reference to a ZIF receiver, the frequency of the receiver LO signal $S_{RLO}$ should be substantially the same as the frequency of the carrier of the received RF signal $S_{RRF}$ (when compensated for Doppler and/or other effects). If such is the case, the phase of the $I_{RX}$ and $Q_{RX}$ data components generated by the RX BB processor 240 should be substantially constant. However, if the frequency of the receiver LO signal $S_{RLO}$ is different than the frequency of the carrier of the received RF signal $S_{RLO}$, the phase of $I_{RX}$ and $Q_{RX}$ data components, if not corrected, rotates as a function of the frequency difference. Accordingly, the rotator component of the RX BB processor 240 counter rotates the phase of the $I_{RX}$ and $Q_{RX}$ data components to compensate for the frequency difference between the receiver LO signal $S_{RLO}$ and the carrier of the received RF signal $S_{RLO}$. In this regard, the rotator component of the RX BB processor 240 generates a compensation signal $S_F$, which may be used to determine the frequency of the resonator signal $S_R$.

As previously discussed, the resonator oscillator 235 includes an associated temperature sensor (e.g., a thermistor), which generates a signal $S_T$ indicative of the temperature of the resonator oscillator 235. For example, the temperature sensor may be integrated with the resonator oscillator 235 in the same package. Alternatively, the temperature sensor may be situated proximate the resonator oscillator 235 such that the temperature signal $S_T$ provides an accurate indication of the temperature of the resonator oscillator 235.

The resonator field calibrator 245 receives the rotator compensation signal $S_F$ from the RX BB processor 240 and the temperature signal $S_T$ from the temperature sensor of the resonator oscillator 235, and generates/updates a frequency-temperature (characteristic) model of the resonator oscillator 235. As previously mentioned, the resonator field calibrator 245 uses the frequency-temperature model upon initial (out-of-the-box) startup or a subsequent cold restart to adjust the frequency of the resonator signal $S_R$ via a frequency-adjustment signal $S_{FA}$ to ensure that the frequency of the resonator signal $S_R$ correlates with the frequency-temperature model based on the current temperature as indicated by the temperature signal $S_T$. This ensures that the error in the frequency of the resonator signal $S_R$ is within a certain margin allowing the RX BB processor 240 to perform the proper phase rotation compensation, if any, to accurately generate the $I_{RX}$ and $Q_{RX}$ data components. In other words, the transceiver 200 is locked to (synchronized with) the received RF signal from the network entity.

Without the frequency-temperature model and the frequency adjustment on initial startup or subsequent cold restart, the error in the frequency of the resonator signal $S_R$ may be beyond the margin in which the RX BB processor 240 is able to perform the proper phase rotation compensation to accurately generate the $I_{RX}$ and $Q_{RX}$ data components. In other words, the transceiver 200 cannot lock onto the received RF signal from the network entity. However, the variation in the frequency-temperature model of resonator oscillators used in such transceiver 200 may be significant, as discussed further herein.

It shall be understood that the transceiver 200 is merely one example, and its implementation may vary significantly based on various transmission and/or reception requirements. As an example, the duplexer 210 may not be needed if the transceiver 200 time-multiplexes the transmission and reception of signals, such as in the case of time division duplexing (TDD). Or, the duplexer 210 may not be needed if separate receive and transmit antennas are coupled to the RF RX 215 and RF TX 225, respectively. Additionally, the transceiver 200 may include other transmit chains and/or receive chains, such as for carrier aggregation (CA), spatial transmission/reception, and/or other applications. Further, the transceiver 200 may include additional filters and/or other RF blocks between the antenna 205 and the RF RX 215 and/or RF TX 225, and/or elsewhere in the transceiver architecture.

Figure 3:
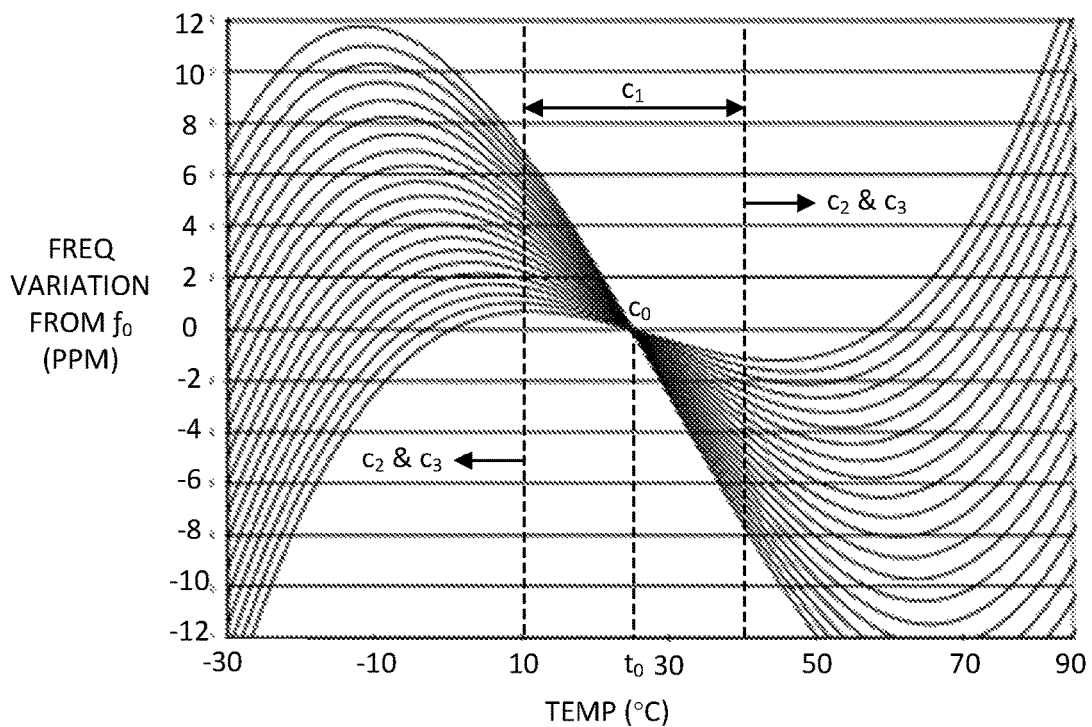
FIG. 3 illustrates a graph of various example frequency-temperature characteristics of resonator oscillators in accordance with another aspect of the disclosure.

FIG. 3 illustrates a graph of various example frequency-temperature characteristics of a resonator (e.g., crystal) oscillator in accordance with another aspect of the disclosure. The x- or horizontal axis of the graph represents temperature in Celsius (° C.) ranging from −30° C. to +90° C. The y- or vertical axis of the graph represents frequency variation from a target frequency $f_0$ at a nominal temperature $t_0$ in parts per million (PPM) ranging from −12 PPM to +12 PPM.

As the graph illustrates, the frequency-temperature characteristic of a resonator oscillator may be coarse tuned to intersect at a particular (target) frequency $f_0$ at a particular (nominal operating) temperature $t_0$ (e.g., 25° C.). The target frequency $f_0$ at the nominal temperature $t_0$ may be set at the UE manufacturing factory. The frequency-temperature characteristic may have an inflection point at such target $f_0$ and nominal temperature $t_0$. That is, the inflection point is the point where the second derivative of the frequency-temperature characteristic becomes substantially zero (0); that is, the slope of the frequency-temperature response has stopped decreasing and is now increasing. The frequency-temperature characteristic of the resonator oscillator may be modeled with a multi-order (e.g., third order) polynomial as follows:

$$f(t)=c_3(t-t_0)^3+c_2(t-t_0)^2+c_1(t-t_0)+c_0 \qquad \text{Eq. 1}$$

Where f(t) is the frequency of the resonator signal $S_R$, t is temperature, to is the nominal temperature, and $c_0$, $c_1$, $c_2$, and $c_3$ are the coefficients of the polynomial.

The zero$^{th}$ coefficient $c_0$ represents the target frequency $f_0$ at the nominal temperature $t_0$ (e.g., 25° C.) which may be set at the factory. The first coefficient $c_1$ represents the variation of f (t) in a substantially linear region on either side of the nominal temperature to (e.g., 10° C. to 40° C.). The second and third coefficients $c_2$ and $c_3$ represent the variation of f(t) in a non-linear region on either side of the nominal temperature $t_0$ (e.g., below 10° C. and above 40° C.). The temperature coefficients $c_1$, $c_2$, and $c_3$ may be determined in the factory, but to reduce testing/tuning time at the factory, the resonator field calibrator 245 updates the coefficients $c_1$, $c_2$, and $c_3$ through field operation of the UE 110. That is, at the factory, the coefficient $c_0$ is set to correspond to the target frequency $f_0$ at the nominal temperature $t_0$. However, at the factory, the coefficients $c_1$, $c_2$, and $c_3$ are set to default values, e.g., in the middle of their expected ranges, which may also depend on the resonator type.

Figure 4:
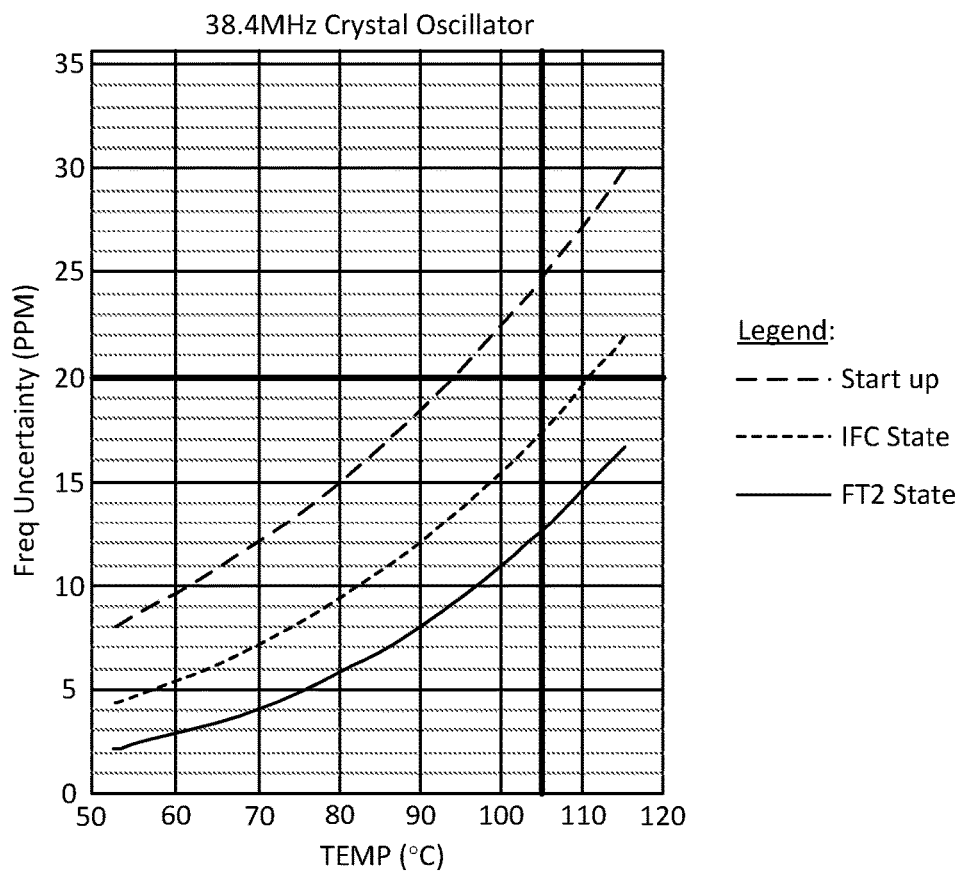
FIG. 4 illustrates a graph of an example frequency uncertainty versus temperature for a particular resonator oscillator in accordance with another aspect of the disclosure.

FIG. 4 illustrates a graph of an example frequency uncertainty versus temperature for a particular resonator oscillator (e.g., 38.4 mega Hertz (MHz) crystal oscillator) in accordance with another aspect of the disclosure. The x- or horizontal axis of the graph represents temperature in Celsius (° C.) ranging from 50° C. to 120° C. The y- or vertical axis of the graph represents frequency uncertainty in parts per million (PPM) ranging from 0 PPM to 35 PPM.

As previously mentioned, the coefficient $c_0$ of the polynomial (Eq. 1) serving as an example of the frequency-temperature characteristic model of the resonator oscillator may be determined or set at the factory. However, the other coefficients $c_1$, $c_2$, and $c_3$ may be set to default values. Thus, out-of-the-box, the actual resonator oscillator may have a different frequency-temperature model than the one set by the factory. This leads to frequency uncertainty in using the factory-set frequency-temperature model to adjusts the frequency of the resonator signal $S_R$.

The out-of-the-box frequency uncertainty is depicted in the graph as a large, dashed curve. In this example, the thicker horizontal line at 20 PPM shown in the graph represents the maximum tolerable frequency uncertainty. That is, if the frequency uncertainty is above 20 PPM (it may be another value), the UE 110 may not be able to lock onto the RF frequency signal transmitted by a network entity. Further, in accordance with this example, the thicker vertical line at 105° C. represents the upper limit of the operating temperature of the UE 110. Accordingly, based on the out-of-the-box frequency uncertainty curve, the frequency uncertainty is above the 20 PPM maximum tolerable frequency uncertainty for operating temperatures 95° C. to 105° C. Thus, if the user initially starts the UE 110 (e.g., an automobile telematics/infotainment device) outside in direct sunlight and in a hot climate such that the device is near such temperature range, the UE 110 may not lock to the RF signal transmitted by a network entity; and if the user is attempting to make an emergency call, this may have adverse consequences.

Thus, upon out-of-the-box start up, the resonator field calibrator 245 of the transceiver 200 of the UE 110 may perform an initial field calibration (IFC) to receive a set of frequency-temperature vectors ($S_F$-$S_T$) from the RX BB processor 240 and the temperature sensor of the resonator oscillator 235, which the resonator field calibrator 245 uses to update or refine the first coefficient $c_1$ of the frequency-temperature polynomial (Eq. 1). As an example, the resonator field calibrator 245 may use several tens of frequency-temperature vectors ($S_F$-$S_T$) in the linear region around the nominal temperature $t_0$ to arrive at a better estimate or convergence of the first coefficient $c_1$. At such time, it may be said that the resonator field calibrator 245 has reached the IFC state.

The IFC state frequency uncertainty is depicted in the graph as a small, dashed curve. According to the IFC state frequency uncertainty curve, the frequency uncertainty is below the 20 PPM maximum tolerable frequency uncertainty for the entire operating temperature range of the UE 110. This means that after the IFC state has been reached, the UE 110 may be able to lock onto the RF signal transmitted by a network entity regardless of the current temperature in which the UE 110 is operating. Thus, it is desirable for the resonator field calibrator 245 to reach the IFC state as soon as possible after out-of-the-box start up.

The resonator field calibrator 245 continues to refine (curve fit) the zero$^{th}$ and first coefficient $c_0$ and $c_1$, while maintaining the second and third coefficients $c_2$ and $c_3$ constant at their default value. Once the second and third coefficients $c_2$ and $c_3$ has achieved a certain convergence (e.g., changing less than a defined threshold for a certain number of frequency-temperature vectors ($S_F$-$S_T$)), it may be said that the resonator field calibrator 245 has reached a state of higher accuracy with regard to the coefficients $c_0$ and $c_1$ than that of the IFC state; this higher accuracy state may be referred to as the FT1 state.

After the FT1 state has been reached, the user continues to use UE 110, and the UE 110 is exposed to more distinct environment temperatures. Accordingly, the resonator field calibrator 245 may receive more frequency-temperature vector ($S_F$-$S_T$) s, which may lie in the nonlinear regions where the second and third coefficients $c_2$ and $c_3$ of the frequency-temperature polynomial (Eq. 1) dominate. The resonator field calibrator 245 uses such additional frequency-temperature vectors ($S_F$-$S_T$) to update the second and third coefficients $c_2$ and $c_3$ such that the frequency-temperature polynomial provides a better estimate of the frequency-temperature characteristic of the resonator oscillator over a wider temperature range. At such time, it may be said that resonator field calibrator 245 has reached another state of even higher accuracy with regard to the frequency-temperature polynomial; this even higher accuracy state may be referred to as the FT2 state.

The FT2 state frequency uncertainty is depicted in the graph as a solid curve. According to the FT2 state frequency uncertainty curve, the frequency uncertainty is well below the 20 PPM maximum tolerable frequency uncertainty by a significant margin (e.g., >7 PPM) for the entire operating temperature range of the UE 110. This means that after the FT2 state has been reached, the UE 110 is highly likely to lock onto an RF signal transmitted by a network entity regardless of the current temperature in which the UE 110 is operating.

Figure 5:
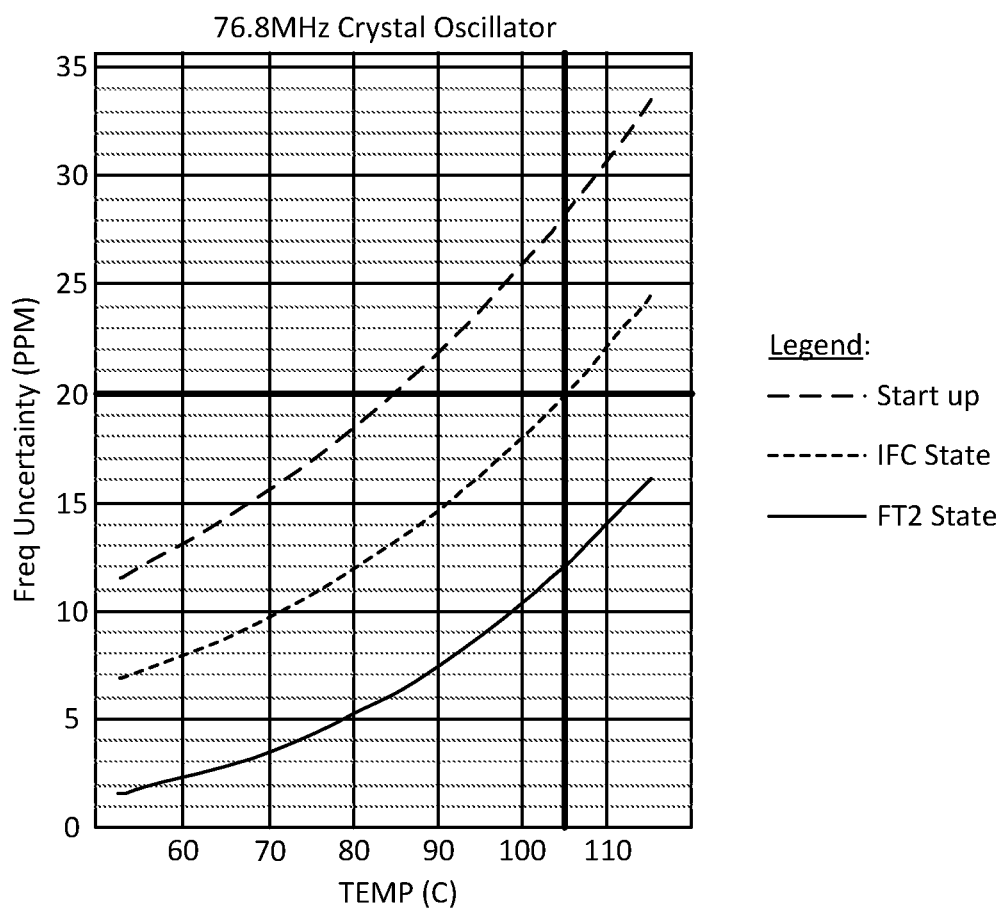
FIG. 5 illustrates a graph of an example frequency uncertainty versus temperature for another particular resonator oscillator in accordance with another aspect of the disclosure.

FIG. 5 illustrates a graph of an example frequency uncertainty versus temperature for another particular resonator (e.g., 76.8 MHz crystal oscillator) in accordance with another aspect of the disclosure. The graph is similar to the graph of FIG. 4. The frequency uncertainty versus temperature graph of FIG. 4 may pertain to a lower frequency (e.g., 38.4 MHz) crystal oscillator. The frequency uncertainty versus temperature graph of FIG. 5 may pertain to a higher frequency (e.g., 76.8 MHz) crystal oscillator.

The higher frequency crystal oscillator may have lower phase noise and improved RF performance. This may be particularly beneficial for a UE configured to wirelessly communicate with a network entity compliant with the New Radio (NR),5th Generation radio access technology (RAT) developed by 3$^{rd}$ Generation Partnership Project (3GPP) in the frequency range 2 (FR2) for bands within 24250 MHz-52600 MHZ.

However, the higher frequency (e.g., 76.8 MHz) crystal oscillator may have an inflection point that is lower in temperature than that of the lower frequency (e.g., 38.4 MHz) crystal oscillator. The consequence of this is that at higher operating temperatures, the out-of-the-box frequency uncertainty or even the IFC state frequency uncertainty may be above or marginally within the 20 PPM maximum tolerable frequency uncertainty.

For example, as the graphs in FIGS. 4-5 illustrate, the out-of-the-box frequency uncertainty for the higher frequency (76.8 MHz) crystal oscillator is above the 20 PPM maximum tolerable frequency uncertainty for operating range of 85° C. to 105° C.; whereas the out-of-the-box frequency uncertainty for the lower frequency (38.4 MHz) crystal oscillator is above the 20 PPM maximum tolerable frequency uncertainty for operating range of 95° C. to 105° C. The IFC state frequency uncertainty for the higher frequency (76.8 MHz) crystal oscillator barely meets the 20 PPM maximum tolerable frequency uncertainty at the maximum operating temperature 105° C.; whereas the IFC state frequency uncertainty for the lower frequency (38.4 MHz) crystal oscillator is below the 20 PPM maximum tolerable frequency uncertainty by a margin of 3 PPM at the maximum operating temperature 105° C. The FT2 state frequency uncertainties for both the higher and lower frequency crystal oscillators have sufficient margin below the 20 PPM maximum tolerable frequency uncertainty. Thus, for the higher frequency crystal oscillator, it is even more desirable to expedite the time to reach the IFC state from the out-of-the-box startup state.

Figure 6A:
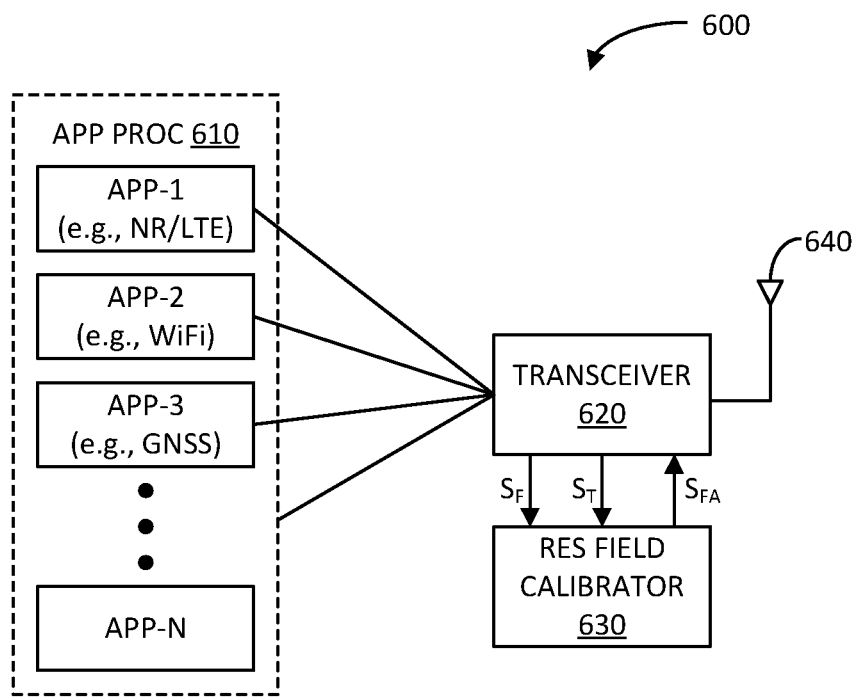
FIG. 6A illustrates a block diagram of an example user equipment (UE) in accordance with another aspect of the disclosure.

FIG. 6A illustrates a block diagram of an example user equipment (UE) 600 in accordance with another aspect of the disclosure. The UE 600 may be an example implementation of the UE 110 previously discussed. The UE 600 includes an applications processor 610, a transceiver 620, at least one antenna 640 (e.g., an antenna array), and a resonator field calibrator 630.

The applications processor 610 may run various applications for the UE 600. For example, the applications processor 610 may run a first application (APP-1) for controlling WWAN wireless communication operations, such as NR and long term evolution (LTE) wireless communication operations with a corresponding one or more base stations (BS). The applications processor 610 may run a second application (APP-2) for controlling WLAN wireless communication operations, such as WiFi wireless communication operations with an access point (AP). The applications processor 610 may run a third application (APP-3) for controlling GNSS wireless communication operations, such as GPS receiving operations with a corresponding one or more GNSS satellites. The applications processor 610 may also run non-modem/transceiver type of applications (e.g., APP-N), such as turning on a display backlight or performing mathematical operations, etc. These applications are merely examples, and the UE 600 may include different, less, or more applications, for example, up to N applications (APP-1 to APP-N), where N is a positive integer.

The transceiver 620 may be implemented per transceiver 200 previously discussed. In this example, the resonator field calibrator 630 is shown separate from the transceiver 620 for ease of explanation. The transceiver 620 is coupled to the applications processor 610 to receive transmit data therefrom, and/or provide received data thereto. The transceiver 620 is also coupled to the at least one antenna 640 for wireless transmission and/or reception of RF signals to and/or from one or more network entities (e.g., GNSS satellite 140, WWAN BS 120, and/or WLAN APs 130). The resonator field calibrator 630, which may be implemented per resonator field calibrator 245 previously discussed, is coupled to the transceiver 620 to receive therefrom frequency-temperature vectors ($S_F$-$S_T$) and provide thereto a frequency adjustment signal $S_{FA}$.

An applications processor (e.g., 610 and 702, discussed further herein), as used herein, may be any dedicated circuit, processor-based hardware, a processing core of a system on chip (SOC), etc., which may or may not include at least a portion of the transceiver 704, such as a modem, used to control signal reception and/or transmission (communication) operations pursuant to various protocols (e.g., NR/LTE, WiFi, GNSS, etc.). Such signal reception and/or transmission operations may include setting the carrier or LO frequency, the bandwidth including configuring appropriate filters, signal reception and/or transmission timing, signal amplification, spatial processing, modulation/demodulation constellation configuration, data processing and packetizing/depacketizing, etc. In some implementations, at least a portion of the functionality/hardware of the application processor may be integrated with a modem and/or transceiver. Hardware examples of an applications processor may include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

The applications processor may be coupled to memory (e.g., generally a computer-readable media or medium), such as a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The memory may store computer-executable code (e.g., software). Software shall be construed broadly to mean instructions, instruction sets, code, code segments, program code, programs, subprograms, software modules, applications, software applications, software packages, routines, subroutines, objects, executables, threads of execution, procedures/processes, functions, etc., whether referred to as software, firmware, middleware, microcode, hardware description language, or otherwise.

Figure 6B:
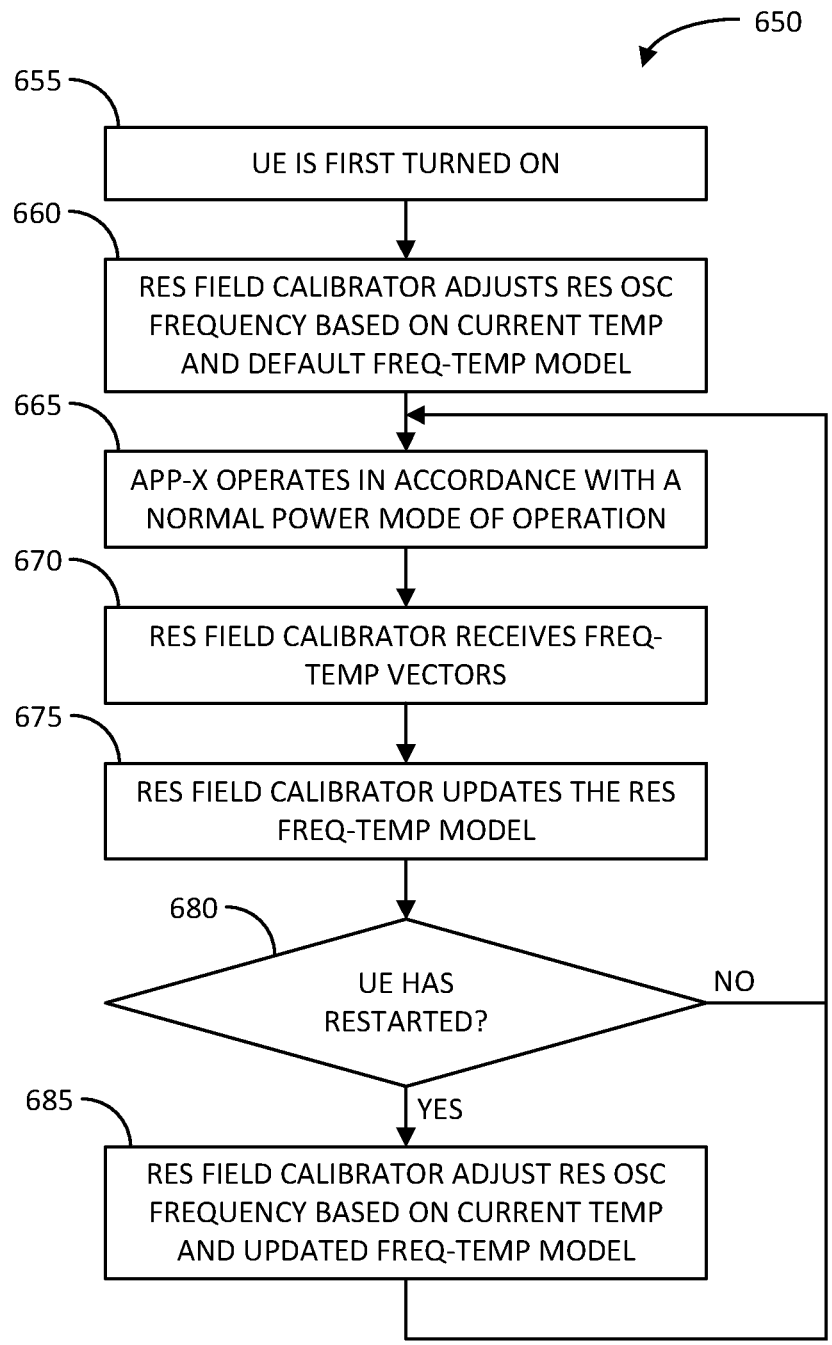
FIG. 6B illustrates a flow diagram of an example method of field updating a frequency-temperature characteristic model of a resonator oscillator and use thereof in accordance with another aspect of the disclosure.

FIG. 6B illustrates a flow diagram of an example method 650 of field updating a frequency-temperature model of a resonator oscillator and use thereof in accordance with another aspect of the disclosure. The method 650 may be implemented by the UE 600 previously discussed.

According to the method 650, the UE 600 is turned on by a user when the device is received from the factory and taken out-of-the-box (block 655). In response to the initial out-of-the-box start up, the resonator field calibrator 630 receives the temperature signal $S_T$ from the transceiver 620, and uses the factory default resonator frequency-temperature model and the current temperature $S_T$ to generate and provide a frequency-adjustment signal $S_{FA}$ to the transceiver 620 (block 660). The resonator oscillator 235 of the transceiver 620 adjusts the frequency of the resonator signal $S_R$ based on the frequency-adjustment signal $S_{FA}$.

Then, according to the method 650, the applications processor 610 operates in accordance with one or more of the applications (e.g., APP-X, where X is one of 1-N) in accordance with a "normal" power mode of operation (block 665). The normal power mode of operation is where the application APP-X wakes up (relatively high power configuration) to perform its required operation, and then goes back to sleep (relatively low power configuration) after completion of the required operation in order to save power. For example, if the application APP-X is application APP-1 (X=1), the application APP-1 may wake up to determine whether the received RF signal has a downlink control information (DCI) addressed to it, and if not, returns back to sleep mode; or if there is a DCI addressed to it that indicates data in a physical shared downlink channel (PSDCH), the application APP-1 accesses the data from the PSDCH, performs whatever operation it has to do with the data, and then goes to sleep mode. In other words, in the normal power mode of operation, the application APP-X wakes up and sleeps based solely on the functional requirement of the application APP-X (and not based on a signal from the resonator field calibrator 630, as discussed further herein).

The method 650 further includes the resonator field calibrator 630 receiving one or more frequency-temperature vectors ($S_F$-$S_T$) from the transceiver 620 (block 670). Considering the previous example of the application APP-1 (X=1), the transceiver 620 receives the RF signal carrying the DCI and/or the PSDCH. The rotator component of the RX BB processor 240 generates the phase rotation compensation signal $S_F$ to correct any frequency difference between the receiver LO signal $S_{RLO}$ and the frequency of the carrier of the received RF signal $S_{RRF}$. As previously discussed, the phase rotation compensation signal $S_F$ provides a measurement of the frequency of the resonator signal $S_R$. Thus, in this example, the phase rotation compensation signal $S_F$ is the frequency component of the frequency-temperature vector ($S_F$-$S_T$) the resonator field calibrator 630 receives from the transceiver 620. The resonator field calibrator 630 also receives the current temperature component of the frequency-temperature vector ($S_F$-$S_T$) from the temperature sensor (e.g., the thermistor) of the resonator oscillator 235 of the transceiver 620.

Then, according to the method 650, the resonator field calibrator 630 updates the frequency-temperature model of the resonator oscillator 235 based on the received one or more frequency-temperature vectors ($S_F$-$S_T$) (block 675). For example, as previously discussed, this may entail the resonator field calibrator 630 performing an IFC state calibration including updating the first coefficient $c_1$ of the frequency-temperature polynomial (Eq. 1) based on the received frequency-temperature vectors ($S_F$-$S_T$) pertaining to temperatures near the nominal temperature $t_0$. Alternatively, or in addition to, the resonator field calibrator 630 may perform an FT1 state calibration including updating (curve fitting) the zero$^{th}$ and first coefficients $c_0$ and $c_1$ of the frequency-temperature polynomial (Eq. 1) based on the received frequency-temperature vectors ($S_F$-$S_T$), while maintaining the second and third coefficients $c_2$ and $c_3$ at their factory default values. Alternatively, or in addition to, the resonator field calibrator 630 may perform an FT2 state calibration including updating the second and third coefficient $c_2$ and $c_3$ of the frequency-temperature polynomial (Eq. 1) based on the received frequency-temperature vectors ($S_F$-$S_T$) pertaining to temperatures in the nonlinear region of the resonator frequency-temperature characteristic.

The method 650 may further include the resonator field calibrator 630 determining whether there has been a new cold restart of the UE 600 (block 680). If not, the UE 600 repeats the operations of blocks 665, 670, and 675 until a new cold restart is detected in block 680. If a new cold restart is detected in block 680, the resonator field calibrator 630 may adjust the frequency of the resonator signal $S_R$ of the resonator oscillator 235 based on the current temperature as indicated by the temperature signal $S_T$ and the current (up-to-date) frequency-temperature model (block 685). The method 650 may then proceed to repeat the operations of blocks 665, 670, 675, 680, and 685 (if needed).

A drawback of the UE 600 and the updating and use of the frequency-temperature model per method 650 is that the resonator field calibrator 630 is dependent on the applications APP-1 to APP-N running on the applications processor 610 to acquire frequency-temperature vectors to update or better refine the frequency-temperature model. For example, if upon out-of-the-box startup, the UE 600 is not used a lot (e.g., the Applications APP-1 to APP-N are generally sleeping most of the time), the resonator field calibrator 630 may not receive sufficient number of frequency-temperature vectors ($S_F$-$S_T$) to achieve an accurate frequency-temperature model. If, in such case, the UE 600 is moved to a location where the temperature is in the high nonlinear region of the resonator frequency-temperature characteristic, the frequency uncertainty in the resonator signal $S_R$ may be above the maximum tolerable frequency uncertainty; which could result in the UE 600 not locking onto an RF signal transmitted by a corresponding network entity. If the UE 600 needs to make an emergency call at such time, adverse consequences may result.

Figure 7A:
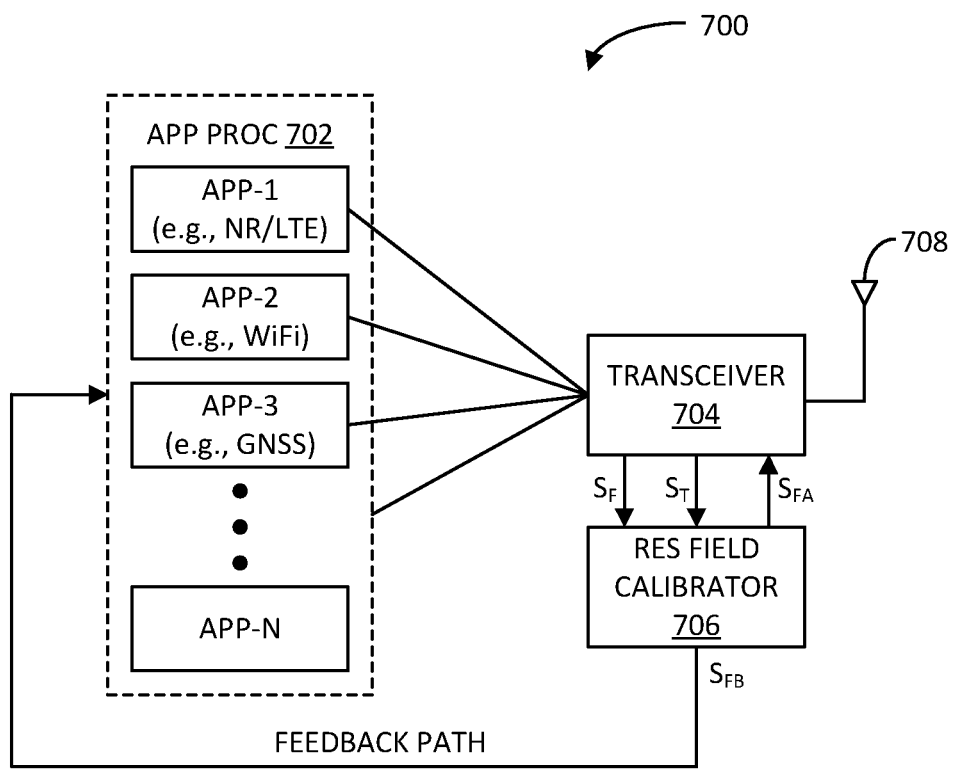
FIG. 7A illustrates a block diagram of another example user equipment (UE) in accordance with another aspect of the disclosure.

FIG. 7A illustrates a block diagram of another example user equipment (UE) in accordance with another aspect of the disclosure. The UE 700 may be another example implementation of the UE 110 previously discussed. Similarly, the UE 700 includes an applications processor 702, a transceiver 704, at least one antenna 708 (e.g., an antenna array), and a resonator field calibrator 706.

Similarly, the applications processor 702 may run various applications for the UE 700. For example, the applications processor 710 may run a first application (APP-1) for controlling WWAN wireless communication operations, such as NR and LTE wireless communication operations with a corresponding one or more base stations (BS). The applications processor 702 may run a second application (APP-2) for controlling WLAN wireless communication operations, such as WiFi wireless communication operations with an access point (AP). The applications processor 702 may run a third application (APP-3) for controlling GNSS wireless communication operations, such as GPS receiving operations with a corresponding one or more GNSS satellites.

As an example, a central processing unit (CPU) and/or digital signal processor (DSP) may perform the operations of the applications processor 702, such as executing the protocol stacks that control transceiver 704 operations to effectuate NR, LTE, GPS, etc. communications. For instance, the transceiver 704 may be a hardware engine under the control and supervision of the applications processor 702. The CPU/DSP and the baseband modem may be part of an SOC, with the RF to baseband conversion hardware being an ancillary RF chipset to the aforementioned SOC. The CPU/DSP may also host (run) the algorithm of the resonator field calibrator 706. The hardware/software configuration for implementing the functionality of the applications processor 702, transceiver 704, and resonator field calibrator 706 may vary depending on many different requirements.

The applications processor 702 may also run non-modem/transceiver type of applications (e.g., APP-N), such as turning on a display backlight or performing mathematical operations, etc. These applications are merely examples, and the UE 700 may include different, less, or more applications, for example, up to N applications (APP-1 to APP-N), where N is a positive integer.

The transceiver 720 may be implemented per transceiver 200 previously discussed. Similarly, in this example, the resonator field calibrator 706 is shown separate from the transceiver 704 for ease of explanation. The transceiver 704 is coupled to the applications processor 702 to receive transmit data therefrom, and/or provide received data thereto. The transceiver 704 is also coupled to the at least one antenna 708 for wireless transmission and/or reception of RF signals to and/or from one or more corresponding network entities. The resonator field calibrator 706, which may be implemented per resonator field calibrator 245 previously discussed, is coupled to the transceiver 704 to receive therefrom frequency-temperature vectors ($S_F$-$S_T$) and provide thereto a frequency adjustment signal $S_{FA}$.

The UE 700 differs from UE 600 in that there is a feedback path between the resonator field calibrator 706 and the applications processor 702. The feedback path allows the resonator field calibrator 706 to send a power mode feedback signal $S_{FB}$ to the applications processor 702. For example, the power mode feedback signal $S_{FB}$ in an aspect may cause the applications processor 702 to enter a higher or elevated power mode of operation to trigger the transceiver 704 to generate more distinct frequency-temperature vectors ($S_F$-$S_T$) that would allow the resonator field calibrator 706 to update or converge the resonator frequency-temperature model in an expedited manner. The feedback signal $S_{FB}$ may be implemented as a messaging protocol, such as Mobile Industry Processor Interface (MIPI), Serial Peripheral Interface (SPI), Inter-Integrated Circuit (I²C), or other.

For example, the feedback signal $S_{FB}$ may instruct the NR/LTE application APP-1 to perform more measurements of the RF signals transmitted by the one or more corresponding network entity so that the transceiver 704 generates more frequency measurements $S_F$ to generate more distinct frequency-temperature vectors ($S_F$-$S_T$). Alternatively, or in addition to, the feedback signal $S_{FB}$ may instruct the NR/LTE application APP-1 to transmit RF signals to the one or more corresponding network entities at higher-than-needed power levels and/or for longer durations to force the temperature $S_T$ of the resonator oscillator 235 to increase by a defined amount to achieve more distinct frequency-temperature vectors ($S_F$-$S_T$). Alternatively, or in addition to, the feedback signal $S_{FB}$ may instruct the non-modem/transceiver application APP-N to turn on the backlight of the display of the UE 700 or perform repetitive mathematical operations to likewise effectuate a defined increase in the temperature of the resonator oscillator 235 to achieve more distinct frequency-temperature vectors ($S_F$-$S_T$).

The aforementioned use of the feedback signal $S_{FB}$ are just a few examples, and the resonator field calibrator 706 may instruct the applications processor 702 to perform additional operations (e.g., via the feedback signal $S_{FB}$) to cause the transceiver 704 to generate more distinct frequency-temperature vectors ($S_F$-$S_T$) so that the resonator field calibrator 706 is able to update or converge the frequency-temperature model in a much more expedited manner compared to that of UE 600. That is, in UE 600, the applications APP-1 to APP-N operate in a normal power mode of operation that is not based on a signal from or influenced by the resonator field calibrator 706. Whereas, in UE 700, the applications APP-1 to APP-N operate in an elevated power mode of operation (higher than the normal power mode of operation) in response to the feedback signal $S_{FB}$ received from the resonator field calibrator 706 so that the transceiver 704 generates more distinct frequency-temperature vectors for the resonator field calibrator 706 to expedite the updating or convergence of the frequency-temperature model of the resonator oscillator 235.

Figures 1, 7B:
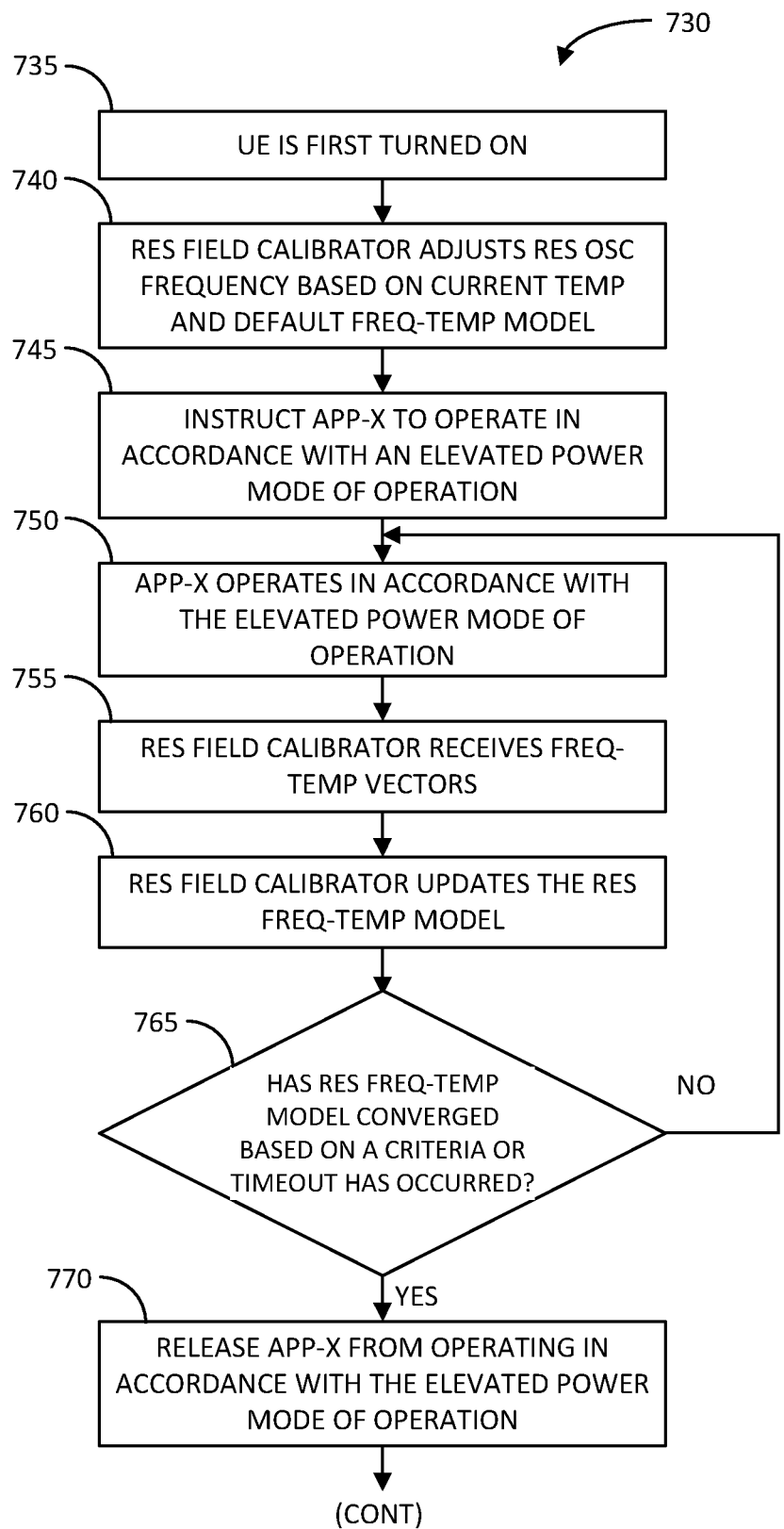
Figures 2, 7B:
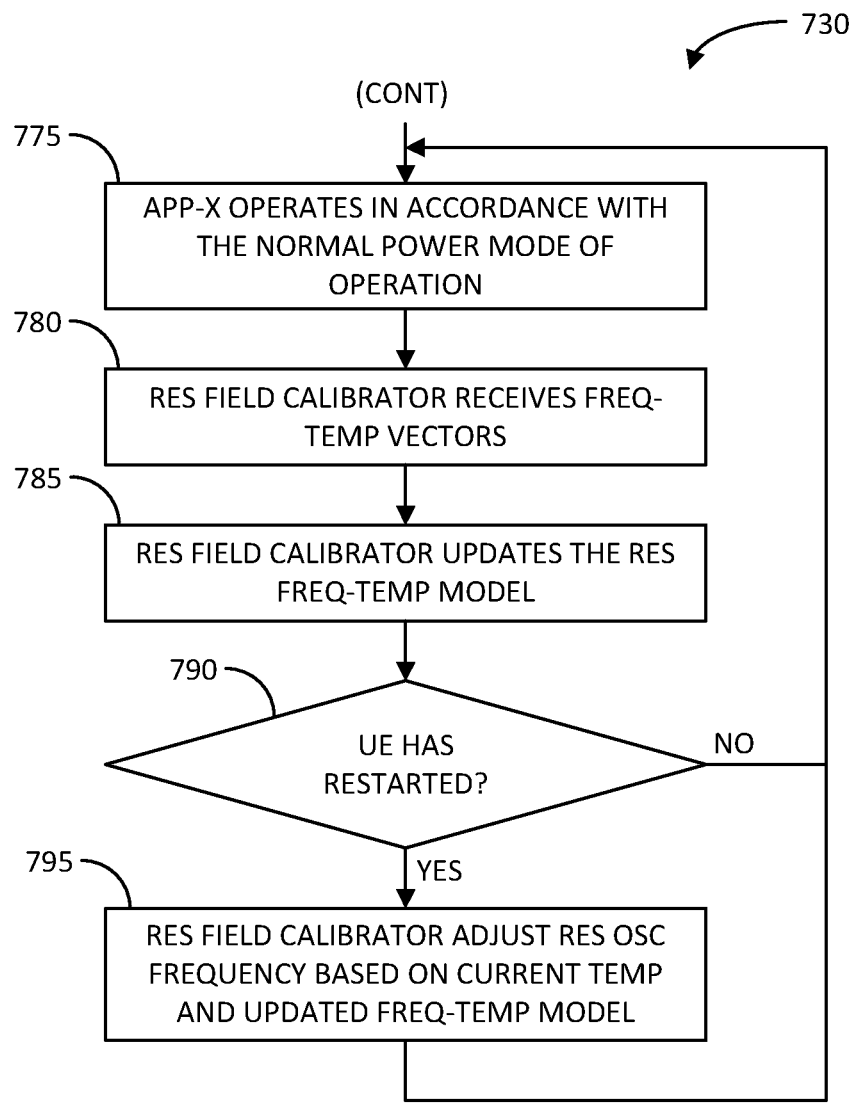

FIG. 7B-1/7B-2 illustrates a flow diagram of another example method 730 of field updating a frequency-temperature model of a resonator oscillator and use thereof in accordance with another aspect of the disclosure. The method 730 may be implemented by the UE 700 previously discussed.

According to the method 730, the UE 700 is turned on by a user when the device is received from the factory and taken out-of-the-box (block 735). In response to the initial out-of-the-box startup, the resonator field calibrator 706 receives the current temperature signal $S_T$ from the transceiver 704, and uses the factory default resonator frequency-temperature model and the current temperature $S_T$ to generate and provide a frequency-adjustment signal $S_{FA}$ to the transceiver 704 (block 740). The resonator oscillator 235 of the transceiver 704 adjusts the frequency of the resonator signal $S_R$ based on the frequency-adjustment signal $S_{FA}$.

Then, according to the method 730, the resonator field calibrator 706 sends the feedback signal $S_{FB}$ to the applications processor 702 via the feedback path to operate in an artificially high second power mode of operation (block 745). As previously discussed, this is done so that the transceiver 704 is able to generate more distinct frequency-temperature vectors ($S_F$-$S_T$) to allow the resonator field calibrator 706 to update or converge the frequency-temperature model of the resonator oscillator 235 in an expedited manner.

The method 730 further includes one or more of the applications APP-1 to APP-N operating in accordance with the second power mode of operation (block 750). As previously discussed, this may entail the feedback signal $S_{FB}$ instructing the NR/LTE application APP-1 to perform more measurements of the RF signals received from the one or more corresponding base stations (BS) so that the transceiver 704 generates more frequency measurements $S_F$ to generate more distinct frequency-temperature vectors ($S_F$-$S_T$). Alternatively, or in addition to, the feedback signal $S_{FB}$ may instruct the NR/LTE application APP-1 to transmit RF signals to the one or more corresponding base stations (BSs) at higher-than-needed power levels and/or for longer durations to force the temperature $S_T$ of the resonator oscillator 235 to increase to achieve more distinct frequency-temperature vectors ($S_F$-$S_T$). Alternatively, or in addition to, the feedback signal $S_{FB}$ may instruct the non-modem/transceiver application APP-N to turn on the backlight of the display of the UE 700 or perform repetitive mathematical calculations to likewise increase the temperature of the resonator oscillator 235 to achieve more distinct frequency-temperature vectors ($S_F$-$S_T$).

Then, according to the method 730, the resonator field calibrator 706 receives frequency-temperature vectors ($S_F$-$S_T$) from the transceiver 704 (block 755). The method 730 additionally includes the resonator field calibrator 706 updating the resonator frequency-temperature model based on the frequency-temperature vectors ($S_F$-$S_T$) (block 760).

Further, according to the method 730, the resonator field calibrator 704 determines whether the resonator frequency-temperature model has converged based on a convergence criteria or a timeout (expiration of a defined time interval associated with updating the resonator frequency-temperature model in accordance with block 760) has occurred (block 765). For example, if the convergence criteria pertain to the first coefficient $c_1$ of the resonator frequency-temperature model (Eq. 1), then convergence may be reached when a certain number of updates to the first coefficient $c_1$ produces a change in the first coefficient $c_1$ less than a threshold. As mentioned, in block 765, the resonator field calibrator 706 may also determine whether a timeout has occurred so that the higher second power mode of operation of the applications processor 702 does not extend too long if convergence has not been reached in order to conserve power.

If the resonator field calibrator 706 determines that neither the convergence criteria has been met nor the timeout has occurred, the method 730 includes repeating the operations specified in blocks 750, 755, 760, and 765. However, if in block 765, the resonator field calibrator 706 has determined that either the convergence criteria has been met or the timeout has occurred, the resonator field calibrator 706, via the feedback signal $S_{FB}$, releases the applications processor 702 from operating the one or more applications APP-1 to APP-N in the elevated mode of operation (block 770). As an example, the feedback signal may be asserted (e.g., a logic one (1)) when instructing the applications processor 702 to operate in the elevated power mode of operation per block 750, and may be deasserted (e.g., a logic zero (0)) when releasing the applications processor 702 from operating in the elevated power mode of operation per block 770. Further, the release may be implicit, such as in the case where the feedback signal instructs the applications processor 702 to operate in the elevated power mode of operation for a certain time interval, and the applications processor 702 ceases operating in the elevated power mode of operation when the time interval has expired.

Then, according to the method 730, the applications processor 710 runs one of the applications (e.g., APP-X, where X is one of 1-N) in accordance with the normal power mode of operation (block 775). As previously mentioned, the normal power mode of operation is where the application APP-X wakes up to perform its required operation, and then goes back to sleep after completion of the required operation in order to save power without the influence of or based on the feedback signal $S_{FB}$ from the resonator field calibrator 706. The elevated power mode of operation may be defined as being higher than the normal power mode of operation in that for the same number of frequency-temperature vectors generated, the UE 110 consumes more power in the elevated power mode of operation than in the normal power mode of operation.

The method 730 further includes the resonator field calibrator 706 receiving additional frequency-temperature vectors ($S_F$-$S_T$) from the transceiver 704 (block 780). Then, according to the method 730, the resonator field calibrator 706 updates the frequency-temperature model based on the received frequency-temperature vectors ($S_F$-$S_T$) (block 785). This is done to refine the frequency-temperature model to account for different temperatures and aging of the resonator oscillator 235. The method 730 may further include the resonator field calibrator 704 determining whether there has been a new cold restart of the UE 700 (block 790). If not, the operations of blocks 775, 780, and 785 are repeated until a new cold restart is detected in block 790. If a new cold restart is detected in block 790, the resonator field calibrator 706 may adjust the frequency of the resonator signal $S_R$ of the resonator oscillator 235 based on the current temperature as indicated by the temperature signal $S_T$ and the current (up-to-date) resonator frequency-temperature model (block 795). The method 730 may then proceed to repeat the operations of blocks 775, 780, 785, 790, and 795 (if needed).

Figure 8:
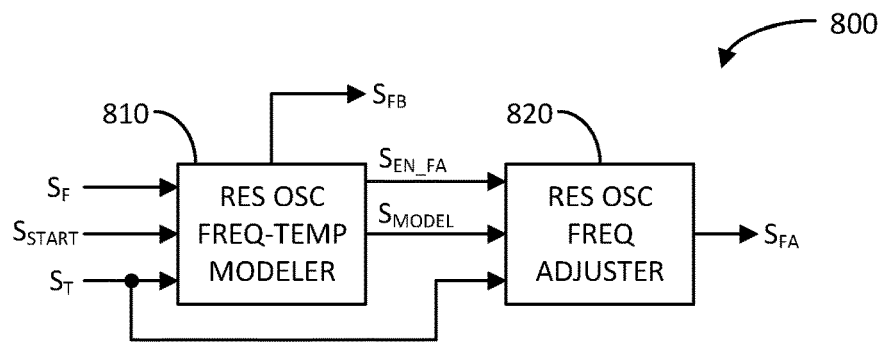
FIG. 8 illustrates a block diagram of an example resonator field calibrator in accordance with another aspect of the disclosure.

FIG. 8 illustrates a block diagram of an example resonator field calibrator 800 in accordance with another aspect of the disclosure. The resonator field calibrator 800 may be an example more detailed implementation of the resonator field calibrators previously discussed. The resonator field calibrator 800 may be a processor-based component (e.g., a microprocessor, microcontroller, etc.), a dedicated-hardware component, or a combination of both. Further, the resonator field calibrator 800 need not be implemented as a stand-alone processor, but may be integrated as part of a modem, receiver, and/or transceiver. It shall also be understood that the processor in which the resonator field calibrator 800 may be implemented may perform other functions, such as be part of the firmware of a controller for a modem, receiver, and/or transceiver.

The resonator field calibrator 800 includes a resonator oscillator frequency-temperature characteristic modeler 810 and a resonator oscillator frequency adjuster 820. Similarly, the frequency-temperature modeler 810 may be as dedicated hardware, processor-based, or a combination of software/firmware driven processor and dedicated hardware. The frequency-temperature modeler 810 may include a first input to receive the frequency measurement signal $S_F$ from, for example, the rotator of the receiver baseband (BB) processor 240. The frequency-temperature modeler 810 may include a second input configured to receive the temperature signal $S_T$ from the temperature sensor associated with the resonator oscillator 235. Additionally, the frequency-temperature modeler 810 may include a third input configured to receive a start signal $S_{START}$ from, for example, the applications processor 702 or other component of the UE 700. The start signal $S_{START}$ indicates an initial (out-of-the-box) cold start or a subsequent cold restart of the UE 700.

The frequency-temperature modeler 810 may include a first output to provide a current (up-to-date) frequency-temperature model $S_{MODEL}$. Additionally, the frequency-temperature modeler 810 may include a second output configured to provide a frequency-adjustment enable signal $S_{EN\_FA}$. Further, the frequency-temperature modeler 810 may include a third output configured to provide a power mode feedback signal $S_{FB}$ to the applications processor 702 as previously discussed.

The frequency adjuster 820, in turn, may include a first input configured to receive the frequency-temperature model $S_{MODEL}$ from the frequency-temperature modeler 810. The frequency adjuster 820 may also include a second input configured to receive the frequency-adjustment enable signal $S_{EN\_FA}$ from the frequency-temperature modeler 810. Additionally, the frequency adjuster 820 may include a third input configured to receive the temperature signal $S_T$ from the temperature sensor associated with the resonator oscillator 235. Further, the frequency adjuster 820 may include an output configured to provide the frequency-adjustment signal $S_{FA}$ to the resonator oscillator 235.

In operation, when the start signal $S_{START}$ indicates an initial (out-of-the-box) cold start, the resonator oscillator frequency-temperature modeler 810 provides the factory default resonator frequency-temperature model $S_{MODEL}$ and the frequency-adjustment enable signal $S_{EN\_FA}$ to the frequency adjuster 820. In response to receiving the factory default resonator frequency-temperature model $S_{MODEL}$ and the frequency-adjustment enable signal $S_{EN\_FA}$, the frequency adjuster 820 receives the current temperature signal $S_T$ from the temperature sensor of the resonator oscillator 235. The frequency adjuster 820 then generates the frequency-adjustment signal $S_{FA}$ based on the factory default resonator frequency-temperature model $S_{MODEL}$ and the current resonator temperature $S_T$, and provides it to the resonator oscillator 235, which tunes the frequency of the resonator signal $S_R$ based on the frequency-adjustment signal $S_{FA}$.

Also, in response to the start signal $S_{START}$ indicating the initial (out-of-the-box) cold start, the resonator oscillator frequency-temperature modeler 810 generates the power mode feedback signal $S_{FB}$ to cause the applications processor 702 to operate the one or more applications APP-1 to APP-N in the higher or elevated power mode of operation. Again, this is done so that the transceiver 704 is able to generate more distinct frequency-temperature vectors ($S_T$-$S_F$) from which the frequency-temperature modeler 810 is able to update or converge the resonator frequency-temperature model in a more expedited manner. Then, the frequency-temperature modeler 810 receives the distinct frequency-temperature vectors ($S_T$-$S_F$) generated pursuant to the higher or elevated power mode of operation, and updates the resonator frequency-temperature model $S_{MODEL}$ based on the received vectors ($S_T$-$S_F$).

The resonator oscillator frequency-temperature modeler 810 then determines whether the resonator frequency-temperature model has converged, or a timeout has occurred. If the frequency-temperature modeler 810 determines that the resonator frequency-temperature model has neither converged nor timed out, the frequency-temperature modeler 810 maintains the power mode feedback signal $S_{FB}$ to operate the applications processor 702 in the higher or elevated power mode of operation while receiving additional frequency-temperature vectors ($S_F$-$S_T$). If the resonator frequency-temperature modeler 810 determines that the resonator frequency-temperature model has converged or timed out, the frequency-temperature modeler 810 generates the power mode feedback signal $S_{FB}$ to release the applications processor 702 from operating in the higher or elevated power mode of operation (the applications processor 702 responding to the feedback signal $S_{FB}$ by operating in a lower or normal power mode of operation).

The resonator oscillator frequency-temperature modeler 810 continues to receive distinct frequency-temperature vectors ($S_T$-$S_F$) generated pursuant to the lower or normal power mode of operation, and updates the resonator frequency-temperature model $S_{MODEL}$ based on the received vectors ($S_T$-$S_F$). If the start signal $S_{START}$ indicates a cold restart, the resonator frequency-temperature modeler 810 provides the current (up-to-date) resonator frequency-temperature model $S_{MODEL}$ and the frequency-adjustment enable signal $S_{EN\_FA}$ to the frequency adjuster 820. In response to receiving the current (up-to-date) resonator frequency-temperature model $S_{MODEL}$ and the frequency-adjustment enable signal $S_{EN\_FA}$, the frequency adjuster 820 receives the current temperature signal $S_T$ from the temperature sensor of the resonator oscillator 235. The frequency adjuster 820 then generates the frequency-adjustment signal $S_{FA}$ based on the current (up-to-date) resonator frequency-temperature model $S_{MODEL}$ and the current resonator temperature $S_T$, and provides it to the resonator oscillator 235, which tunes the frequency of the resonator signal $S_R$ based on the frequency-adjustment signal $S_{FA}$.

Figure 9:
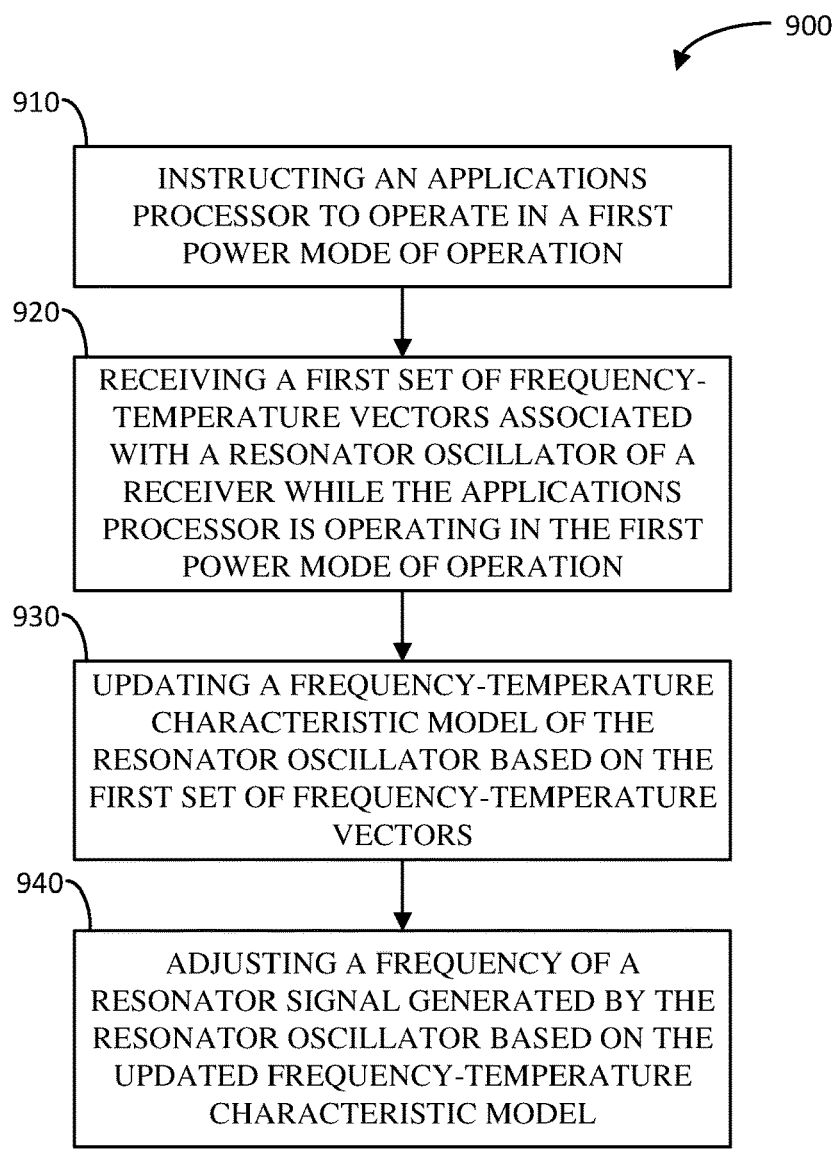
FIG. 9 illustrates a flow diagram of an example method of adjusting a frequency of a resonator signal generated by a resonator oscillator in accordance with another aspect of the disclosure.

FIG. 9 illustrates a flow diagram of an example method 900 of adjusting a frequency of a resonator signal generated by a resonator oscillator in accordance with another aspect of the disclosure. The method 900 includes instructing an applications processor to operate in a first power mode of operation (block 910). Examples of means for instructing an applications processor to operate in a first power mode of operation include the resonator field calibrator 706 and the resonator oscillator frequency-temperature modeler 810 of the resonator field calibrator 800.

The method 900 further includes receiving a first set of frequency-temperature vectors associated with a resonator oscillator of a receiver while the applications processor is operating in the first power mode of operation (block 920). Examples of means for receiving a first set of frequency-temperature vectors associated with a resonator oscillator of a receiver while the applications processor is operating in the first power mode of operation include the resonator field calibrator 706 and the resonator oscillator frequency-temperature modeler 810 of the resonator field calibrator 800.

Additionally, the method 900 includes updating a frequency-temperature characteristic model of the resonator oscillator based on the first set of frequency-temperature vectors (block 930). Examples of means for updating a frequency-temperature characteristic model of the resonator oscillator based on the first set of frequency-temperature vectors include the resonator field calibrator 706 and the resonator oscillator frequency-temperature modeler 810 of the resonator field calibrator 800.

Also, the method 900 includes adjusting a frequency of a resonator signal generated by the resonator oscillator based on the updated frequency-temperature characteristic model (block 940). Examples of means for adjusting a frequency of a resonator signal generated by the resonator oscillator based on the updated frequency-temperature characteristic model include the resonator field calibrator 706 and the resonator oscillator frequency adjuster 820 of the resonator field calibrator 800.

According to the method 900, instructing the applications processor to operate in the first power mode of operation may be in response to an initial startup of an associated user equipment (UE). The method 900 may also include releasing the applications processor from operating in the first power mode of operation in response to the updated frequency-temperature characteristic model meeting a convergence criteria or an expiration of a defined time interval associated with updating the frequency-temperature characteristic model based on the first set of frequency-temperature vectors. Examples of means for releasing the applications processor from operating in the first power mode of operation include the resonator field calibrator 706 and the resonator oscillator frequency-temperature modeler 810 of the resonator field calibrator 800.

Further, the applications processor may operate in a second power mode of operation after releasing of the applications processor from operating in the first power mode of operation. In such case, the method 900 may include receiving a second set of frequency-temperature vectors associated with the resonator oscillator of the receiver while the applications processor is operating in the second power mode of operation; and updating the updated frequency-temperature characteristic model of the resonator oscillator based on the second set of frequency-temperature vectors. Examples of means for receiving a second set of frequency-temperature vectors associated with the resonator oscillator of the receiver while the applications processor is operating in the second power mode of operation, and means for updating the updated frequency-temperature characteristic model of the resonator oscillator based on the second set of frequency-temperature vectors include the resonator field calibrator 706 and the resonator oscillator frequency-temperature modeler 810 of the resonator field calibrator 800.

The following provides an overview of aspects of the present disclosure:

Aspect 1: A method for temperature compensation, comprising: instructing an applications processor to operate in a first power mode of operation; receiving a first set of frequency-temperature vectors associated with a resonator oscillator of a transceiver while the applications processor is operating in the first power mode of operation; updating a frequency-temperature characteristic model of the resonator oscillator based on the first set of frequency-temperature vectors; and adjusting a frequency of a resonator signal generated by the resonator oscillator based on the updated frequency-temperature characteristic model.

Aspect 2: The method of aspect 1, wherein instructing the applications processor to operate in the first power mode of operation is in response to an initial startup of an associated user equipment (UE).

Aspect 3: The method of aspect 1 or 2, further comprising releasing the applications processor from operating in the first power mode of operation.

Aspect 4: The method of aspect 3, wherein releasing the applications processor from operating in the first power mode of operation is in response to the updated frequency-temperature characteristic model meeting a convergence criteria.

Aspect 5: The method of aspect 3, wherein releasing the applications processor from operating in the first power mode of operation is in response to an expiration of a defined time interval associated with updating the frequency-temperature characteristic model based on the first set of frequency-temperature vectors.

Aspect 6: The method of any one of aspects 3-5, wherein the applications processor operates in a second power mode of operation after releasing of the applications processor from operating in the first power mode of operation, and further comprising: receiving a second set of frequency-temperature vectors associated with the resonator oscillator of the transceiver while the applications processor is operating in the second power mode of operation; and updating the updated frequency-temperature characteristic model of the resonator oscillator based on the second set of frequency-temperature vectors.

Aspect 7: The method of any one of aspects 1-6, wherein instructing the applications processor to operate in the first power mode of operation comprises instructing the applications processor to operate in the first power mode of operation to effectuate a defined increase in a temperature of the resonator oscillator.

Aspect 8: The method of any one of aspects 1-7, wherein the first power mode of operation comprises the applications processor causing the transceiver to operate.

Aspect 9: The method of any one of aspects 1-7, wherein the first power mode of operation comprises the applications processor producing at least one non-transceiver operation.

Aspect 10: The method of aspect 9, wherein the at least one non-transceiver operation includes performing a mathematical operation or turning on a backlight of a display.

Aspect 11: A user equipment (UE) including: at least one antenna; a transceiver coupled to the at least one antenna, wherein the transceiver comprises: a resonator oscillator configured to generate a resonator signal, and a temperature sensor configured to generate a temperature signal related to a temperature of the resonator oscillator; an applications processor coupled to the transceiver; and a resonator field calibrator coupled to the applications processor and the transceiver.

Aspect 12: The UE of aspect 11, wherein the resonator field calibrator is configured to transmit a feedback signal instructing the applications processor to operate in a first mode of operation.

Aspect 13: The UE of aspect 11 or 12, wherein the resonator field calibrator is configured to update a frequency-temperature characteristic model of the resonator oscillator based on a set of frequency-temperature vectors based on a frequency of the resonator signal and the temperature signal.

Aspect 14: The UE of aspect 13, wherein the resonator field calibrator is configured to adjust the frequency of the resonator signal based on the updated frequency-temperature characteristic mode of the resonator oscillator and a current temperature as indicated by the temperature signal.

Aspect 15: The UE of aspect 13 or 14, wherein the resonator field calibrator is configured to set the applications processor in a first power mode of operation, wherein the set of frequency-temperature vectors includes a first subset of frequency-temperature vectors generated while the applications processor is operating in the first power mode of operation.

Aspect 16: The UE of aspect 15, wherein the resonator field calibrator is configured to set the applications processor in the first power mode of operation in response to an initial startup of the UE.

Aspect 17: The UE of aspect 15 or 16, wherein the resonator field calibrator is configured to set the applications processor in the first power mode of operation to cause the transceiver to receive radio frequency (RF) signals from which frequency components of the first subset of frequency-temperature vectors are generated.

Aspect 18: The UE of any one of aspects 15-17, wherein the resonator field calibrator is configured to release the applications processor from operating in the first power mode of operation, and wherein the applications processor is configured to operate in a second power mode of operation in response to the release.

Aspect 19: The UE of aspect 18, wherein the first power mode of operation is higher than the second power mode of operation.

Aspect 20: The UE of aspect 18 or 19, wherein the resonator field calibrator is configured to release the applications processor from operating in the first power mode of operation in response to the updated frequency-temperature characteristic model meeting a convergence criteria.

Aspect 21: The UE of aspect 18 or 19, wherein the resonator field calibrator is configured to release the applications processor from operating in the first power mode of operation in response to an expiration of a defined time interval associated with updating the frequency-temperature characteristic model based on the first subset of frequency-temperature vectors.

Aspect 22: The UE of any one of aspects 18-21, wherein the frequency-temperature characteristic model is characterized with at least a third-order polynomial as follows: $f(t)=c_3(t-t_0)^3+c_2(t-t_0)^2+c_1(t-t_0)+c_0$ wherein f(t) is the frequency of the resonator signal as a function of the temperature t of the resonator oscillator, $t_0$ is a defined temperature of the resonator oscillator, and $c_0$, $c_1$, $c_2$, and $c_3$ are coefficients of the third-order polynomial.

Aspect 23: The UE of aspect 22, wherein the resonator field calibrator is configured to release the applications processor from operating in the first power mode of operation in response to the coefficient $c_1$ meeting a convergence criteria.

Aspect 24: The UE of aspect 22 or 23, wherein the resonator field calibrator is configured to update at least one of the coefficient $c_0$ or $c_1$ based on the first subset of frequency-temperature vectors while maintaining the coefficients $c_2$ and $c_3$ constant.

Aspect 25: The UE of any one of aspects 18-24, wherein the set of frequency-temperature vectors includes a second subset of frequency-temperature vectors generated while the applications processor is operating in the second power mode of operation.

Aspect 26: The UE of aspect 25, wherein the resonator field calibrator is configured to update at least one or more of the coefficients $c_0$, $c_1$, $c_2$, and $c_3$ based on the second subset of frequency-temperature vectors.

Aspect 27: The UE of aspect 26, wherein the resonator field calibrator is configured to adjust the frequency of the resonator signal based on the updated frequency-temperature characteristic mode of the resonator oscillator and a current temperature as indicated by the temperature signal in response to a restart of the UE.

Aspect 28: An apparatus, comprising: means for instructing an applications processor to operate in a first power mode of operation; means for receiving a first set of frequency-temperature vectors associated with a resonator oscillator of a receiver while the applications processor is operating in the first power mode of operation; means for updating a frequency-temperature characteristic model of the resonator oscillator based on the first set of frequency-temperature vectors; and means for adjusting a frequency of a resonator signal generated by the resonator oscillator based on the updated frequency-temperature characteristic model.

Aspect 29: The apparatus of aspect 28, wherein the means for instructing the applications processor to operate in the first power mode of operation is responsive to an initial startup of an associated user equipment (UE).

Aspect 30: A non-transitory computer-readable medium storing computer-executable code, comprising code for causing a processor in a user equipment to: instruct an applications processor to operate in a first power mode of operation; receive a first set of frequency-temperature vectors associated with a resonator oscillator of a receiver while the applications processor is operating in the first power mode of operation; update a frequency-temperature characteristic model of the resonator oscillator based on the first set of frequency-temperature vectors; and adjust a frequency of a resonator signal generated by the resonator oscillator based on the updated frequency-temperature characteristic model.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed:

1. A method for temperature compensation, comprising:
   instructing an applications processor to operate in a first power mode of operation;
   receiving a first set of frequency-temperature vectors associated with a resonator oscillator of a transceiver while the applications processor is operating in the first power mode of operation;
   updating a frequency-temperature characteristic model of the resonator oscillator based on the first set of frequency-temperature vectors; and
   adjusting a frequency of a resonator signal generated by the resonator oscillator based on the updated frequency-temperature characteristic model.

2. The method of claim 1, wherein instructing the applications processor to operate in the first power mode of operation is in response to an initial startup of an associated user equipment (UE).

3. The method of claim 1, further comprising releasing the applications processor from operating in the first power mode of operation.

4. The method of claim 3, wherein releasing the applications processor from operating in the first power mode of operation is in response to the updated frequency-temperature characteristic model meeting a convergence criteria.

5. The method of claim 3, wherein releasing the applications processor from operating in the first power mode of operation is in response to an expiration of a defined time interval associated with updating the frequency-temperature characteristic model based on the first set of frequency-temperature vectors.

6. The method of claim 3, wherein the applications processor operates in a second power mode of operation after releasing of the applications processor from operating in the first power mode of operation, and further comprising:
   receiving a second set of frequency-temperature vectors associated with the resonator oscillator of the transceiver while the applications processor is operating in the second power mode of operation; and
   updating the updated frequency-temperature characteristic model of the resonator oscillator based on the second set of frequency-temperature vectors.

7. The method of claim 1, wherein instructing the applications processor to operate in the first power mode of operation comprises instructing the applications processor to operate in the first power mode of operation to effectuate a defined increase in a temperature of the resonator oscillator.

8. The method of claim 1, wherein the first power mode of operation comprises the applications processor causing the transceiver to operate.

9. The method of claim 1, wherein the first power mode of operation comprises the applications processor producing at least one non-transceiver operation.

10. The method of claim 9, wherein the at least one non-transceiver operation includes performing a mathematical operation or turning on a backlight of a display.

11. A user equipment (UE), comprising:
    at least one antenna;
    a transceiver coupled to the at least one antenna, wherein the transceiver comprises:
      a resonator oscillator configured to generate a resonator signal; and
      a temperature sensor configured to generate a temperature signal related to a temperature of the resonator oscillator;
    an applications processor coupled to the transceiver; and
    a resonator field calibrator coupled to the applications processor and the transceiver, wherein the resonator field calibrator is configured to transmit a feedback signal instructing the applications processor to operate in a first mode of operation.

12. The UE of claim 11, wherein the resonator field calibrator is configured to update a frequency-temperature characteristic model of the resonator oscillator based on a set of frequency-temperature vectors based on a frequency of the resonator signal and the temperature signal.

13. The UE of claim 12, wherein the resonator field calibrator is configured to adjust the frequency of the resonator signal based on the updated frequency-temperature characteristic model of the resonator oscillator and a current temperature as indicated by the temperature signal.

14. The UE of claim 12, wherein the set of frequency-temperature vectors includes a first subset of frequency-temperature vectors generated while the applications processor is operating in the first power mode of operation.

15. The UE of claim 14, wherein the resonator field calibrator is configured to set the applications processor in the first power mode of operation in response to an initial startup of the UE.

16. The UE of claim 14, wherein the resonator field calibrator is configured to set the applications processor in the first power mode of operation to cause the transceiver to receive radio frequency (RF) signals from which frequency components of the first subset of frequency-temperature vectors are generated.

17. The UE of claim 14, wherein the resonator field calibrator is configured to release the applications processor from operating in the first power mode of operation, and wherein the applications processor is configured to operate in a second power mode of operation in response to the release.

18. The UE of claim 17, wherein the first power mode of operation is higher than the second power mode of operation.

19. The UE of claim 17, wherein the resonator field calibrator is configured to release the applications processor from operating in the first power mode of operation in response to the updated frequency-temperature characteristic model meeting a convergence criteria.

20. The UE of claim 17, wherein the resonator field calibrator is configured to release the applications processor from operating in the first power mode of operation in response to an expiration of a defined time interval associated with updating the frequency-temperature characteristic model based on the first subset of frequency-temperature vectors.

21. The UE of claim 17, wherein the frequency-temperature characteristic model is characterized with at least a third-order polynomial as follows:

$$f(t)=c_3(t-t_0)^3+c_2(t-t_0)^2+c_1(t-t_0)+c_0$$

wherein $f(t)$ is the frequency of the resonator signal as a function of the temperature $t$ of the resonator oscillator, $t_0$ is a defined temperature of the resonator oscillator, and $c_0, C_1, C_2,$ and $c_3$ are coefficients of the third-order polynomial.

22. The UE of claim 21, wherein the resonator field calibrator is configured to release the applications processor from operating in the first power mode of operation in response to the coefficient $c_1$ meeting a convergence criteria.

23. The UE of claim 21, wherein the resonator field calibrator is configured to update at least one of the coefficient $c_0$ or $c_1$ based on the first subset of frequency-temperature vectors while maintaining the coefficients $c_2$ and $c_3$ constant.

24. The UE of claim 21, wherein the set of frequency-temperature vectors includes a second subset of frequency-temperature vectors generated while the applications processor is operating in the second power mode of operation.

25. The UE of claim 24, wherein the resonator field calibrator is configured to update at least one or more of the coefficients $c_0, C_1, C_2,$ and $c_3$ based on the second subset of frequency-temperature vectors.

26. The UE of claim 25, wherein the resonator field calibrator is configured to adjust the frequency of the resonator signal based on the updated frequency-temperature characteristic model of the resonator oscillator and a current temperature as indicated by the temperature signal in response to a restart of the UE.

27. The UE of claim 11, wherein the first mode of operation corresponds to an elevated power mode.

28. The UE of claim 11, wherein the first mode of operation is configured to cause the transceiver to increase a number of measurements provided to the resonator field calibrator.

29. An apparatus, comprising:
means for instructing an applications processor to operate in a first power mode of operation;
means for receiving a first set of frequency-temperature vectors associated with a resonator oscillator of a receiver while the applications processor is operating in the first power mode of operation;
means for updating a frequency-temperature characteristic model of the resonator oscillator based on the first set of frequency-temperature vectors; and
means for adjusting a frequency of a resonator signal generated by the resonator oscillator based on the updated frequency-temperature characteristic model.

30. A non-transitory computer-readable medium storing computer-executable code, comprising code for causing a processor in a user equipment to:
instruct an applications processor to operate in a first power mode of operation;
receive a first set of frequency-temperature vectors associated with a resonator oscillator of a receiver while the applications processor is operating in the first power mode of operation;
update a frequency-temperature characteristic model of the resonator oscillator based on the first set of frequency-temperature vectors; and
adjust a frequency of a resonator signal generated by the resonator oscillator based on the updated frequency-temperature characteristic model.

* * * * *